Figure 1:
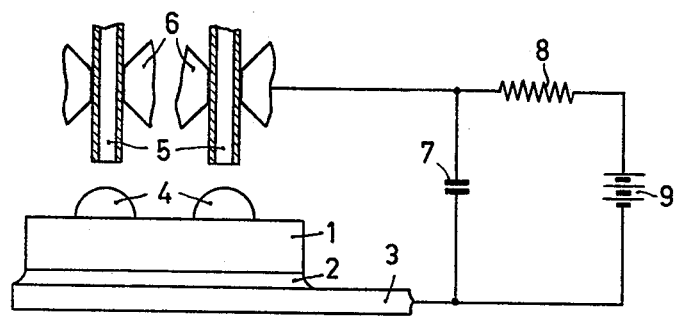

June 9, 1964 A. F. J. BERNDSEN 3,136,032
METHOD OF MANUFACTURING SEMI-CONDUCTOR DEVICES
Filed Jan. 25, 1962

INVENTOR
ALPHONSIUS F.J. BERNDSEN
BY
AGENT

United States Patent Office 3,136,032
Patented June 9, 1964

3,136,032
METHOD OF MANUFACTURING SEMI-
CONDUCTOR DEVICES
Alphonsius Franciscus Johannes Berndsen, Mollenhutse-
weg, Nijmegen, Netherlands, assignor to North Ameri-
can Philips Company, Inc., New York, N.Y., a corpo-
ration of Delaware
Filed Jan. 25, 1962, Ser. No. 168,620
Claims priority, application Netherlands Feb. 3, 1961
7 Claims. (Cl. 29—155.5)

The invention relates to a method of manufacturing semi-conductor devices, such as transistors or crystal diodes, in which a contact disposed on a semi-conductor body is provided with a current supply conductor.

It is known to secure such a conductor, for example a wire, to a contact by soldering, but it is also known to attach it by welding.

The term "welding" is used herein to denote a method in which an electric current of such strength is passed through the two parts to be joined for a time such that the two parts are fused to one another at the area of contact. Usually the current is supplied by a capacitor discharge and the method is referred to as percussive welding.

In order to obtain a satisfactory soldered joint it is desirable for the wire to be provided with a surface which is readily wetted by the solder, and this generally is a layer of tin. However, the provision of such a layer has a limitation in that the wire tends to adhere to the tool by which it is held during soldering. This disadvantage becomes more marked as the wire is thinner, for example thinner than 200 microns. Such thin wires provide difficulty in welding also, the resulting joint being strong enough and frequently becoming detached in further mounting of the semi-conductor device.

The present invention, one of the objects of which is to obviate these disadvantages, is based on the recognition that the adherence to the tool does not occur in welding, while soldering provides a stronger joint than welding.

According to the invention, a conductor comprising a core and a coating, the melting point of which is lower than that of the core, by means of a pair of tongs is arranged on the contact, the melting point of which is higher than that of the coating, and welded to the contact, after which the conductor is released and at least its part adjacent the contact is heated to a temperature lower than the melting points of the core and the contact but higher than that of the coating, so that at least part of the material of the coating melts and forms a soldered connection between the core and the contact.

The coating of the wire may consist of tin or a lower melting alloy consisting mainly of tin, for example an alloy containing 60% by weight of tin and 40% by weight of lead. The core may consist of nickel and/or copper and the contact may consist entirely or substantially of lead, bismuth or tin.

In the usual manner, the material of the contact may contain doping elements the choice of which depends upon the nature of the semi-conductor body. Obviously, these examples are not limitative.

Without departing from the scope of the invention, the shape of the conductor and the composition of the contact, the core and the coating may obviously be varied.

Figure 2:
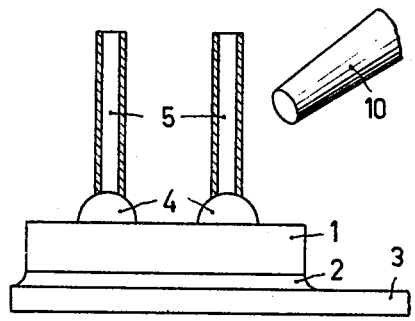
Figure 3:
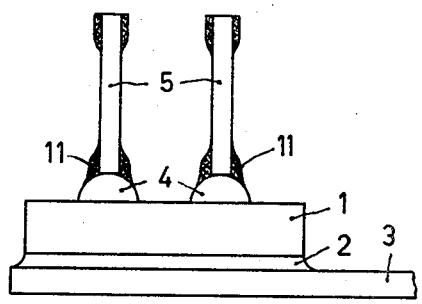

In order that the invention may readily be carried into effect, an embodiment thereof will now be described, by way of example, with reference to the accompanying diagrammatic drawings, in which:

FIGURES 1, 2 and 3 are side elevations of the various stages of the method in which two contacts of a transistor are provided with supply leads.

The transistor comprises a semi-conductor body 1, the composition of which is not of importance for the invention and which is secured to a metal support 3 by means of a layer of solder 2 (FIGURE 1). The body carries two contacts 4 which may consist of lead to which doping elements may be added in order to influence the electrical properties. These contacts may be fused to the body 1 in the usual manner; their diameters may be say 150 microns. Two wires 5 are welded to these contacts 4. The wires have diameters of 100 microns; each wire comprises a copper clad core of nickel having a diameter of 80 microns which is covered with a coating or cladding consisting of an eutectic lead-tin alloy 10 microns thick. Each wire is held in a pair of steel tongs 6 shown diagrammatically. Each pair of tongs is connected to one terminal of a current supply device, each of these supply devices (only one of which is shown) comprising a capacitor 7 which is charged by a battery 9 through a resistor 8, the support 3 being connected to the other terminals of said devices. The battery voltage may be 80 volts, the capacitance of the capacitor 10,000 pf., the resistor 8 may be 1 megohm.

When a wire 5 is disposed on a contact 4, the capacitor will discharge to pass a pulse of current through the clad wire and the wire will be welded to the contact without melting of the lead-tin cladding. However, this welded joint is too weak to be used in the further operations of mounting the transistor, but it is strong enough to support the wires themselves (FIGURE 2). When the tongs have been removed, a heated reducing gas, for example hydrogen, is blown from a nozzle 10 against the wires 5. The gas may have a temperature of 275° C. The layers of the lead-tin alloy partly melt and flow over the contact 4, so that soldered joints 11 are produced which surround and strengthen the original welded joints (FIGURE 3).

For enabling a comparison between the melting properties of the materials of the wire and the contacts, their melting points will now be given. The melting points of the materials of the core of the wire are about 1450° C. for nickel and about 1080° C. for copper. The melting point of the doped lead of the contacts may be between about 280° C. and 327° C. (the melting point of pure lead), depending on the type and the amounts of doping element used. The melting point of the eutectic lead-tin alloy consisting of about 60% by weight of tin and 40% by weight of lead is approximately 183° C.

What is claimed is:

1. A method of attaching an electrically conductive lead to a fused metal contact on a semiconductive body, comprising the steps of providing a solder-clad wire core as the conductive lead, the melting point of said solder cladding being lower than that of the wire core and that of the metal contact, supporting by holding means the clad wire in contact with the metal contact, passing a pulse of current through the clad wire and the contact to weld the clad wire to the contact without melting the solder cladding, thereafter removing the holding means, thereafter heating the portion of the clad wire adjacent the contact at a temperature above the melting point of the solder cladding but below the melting points of the contact and wire core to melt at least a portion of the cladding and form a soldered joint of the wire core to the metal contact.

2. A method as set forth in claim 1 wherein the core is of a metal selected from the group consisting of nickel, copper, and copper-clad nickel.

3. A method as set forth in claim 2 wherein the cladding is of a metal selected from the group consisting of tin and tin alloys.

4. A method as set forth in claim 1 wherein the contact is of a metal selected from the group consisting of lead, tin, bismuth, and alloys thereof.

5. A method of attaching an electrically conductive lead to a fused metal contact on a semiconductive body in the manufacture of a semiconductor device, comprising the steps of providing a thin solder-clad wire core as the conductive lead, the melting point of said solder cladding being lower than that of the wire core and that of the metal contact, gripping the clad wire by holding means and positioning and maintaining the wire end in contact with the metal contact, passing a pulse of current through the clad wire and the contact to weld the clad wire to the contact without melting the cladding and causing the holding means to adhere to the clad wire, thereafter removing the holding means, thereatfer, without holding the wire, heating the portion of the clad wire adjacent the contact at a temperature above the melting point of the solder cladding but below the melting points of the contact and wire core to melt the portion of the cladding adjacent the contact and form a reinforced soldered joint of the wire core to the metal contact.

6. A method as set forth in claim 5 wherein the clad wire has a diameter below 200 microns.

7. A method as set forth in claim 5 wherein the cladding is melted using heated gas.

References Cited in the file of this patent

UNITED STATES PATENTS

| | | |
|---|---|---|
| 2,870,052 | Rittmann | Jan. 20, 1959 |
| 2,877,396 | Armstrong | Mar. 10, 1959 |

UNITED STATES PATENT OFFICE
CERTIFICATE OF CORRECTION

Patent No. 3,136,032                              June 9, 1964

Alphonsius Franciscus Johannes Berndsen

It is hereby certified that error appears in the above numbered patent requiring correction and that the said Letters Patent should read as corrected below.

Column 1, line 33, after "joint" insert -- not --; column 3, line 15, for "thereatfer" read -- thereafter --.

Signed and sealed this 27th day of October 1964.

(SEAL)
Attest:

ERNEST W. SWIDER
Attesting Officer

EDWARD J. BRENNER
Commissioner of Patents